(12) United States Patent
Kim et al.

(10) Patent No.: US 9,069,210 B2
(45) Date of Patent: Jun. 30, 2015

(54) DISPLAY DEVICE AND METHOD OF MANUFACTURING THE SAME

(71) Applicant: Samsung Display Co., Ltd., Yongin (KR)

(72) Inventors: Hyosik Kim, Yongin-si (KR); Su Jeong Kim, Seoul (KR); Hokil Oh, Yongin-si (KR); Hoon Kim, Ansan-si (KR); Kichul Shin, Suwon-si (KR); Jae-Hoon Jung, Anyang-si (KR)

(73) Assignee: Samsung Display Co., Ltd., Yongin (KR)

( * ) Notice: Subject to any disclaimer, the term of this patent is extended or adjusted under 35 U.S.C. 154(b) by 8 days.

(21) Appl. No.: 13/865,696

(22) Filed: Apr. 18, 2013

(65) Prior Publication Data

US 2014/0184963 A1 Jul. 3, 2014

(30) Foreign Application Priority Data

Dec. 28, 2012 (KR) .................. 10-2012-0156746

(51) Int. Cl.
*C09K 19/00* (2006.01)
*G02F 1/1337* (2006.01)

(52) U.S. Cl.
CPC .... *G02F 1/133719* (2013.01); *G02F 1/133753* (2013.01); *G02F 2001/133715* (2013.01)

(58) Field of Classification Search
CPC .................. C08G 77/20; G02F 2001/133742; G02F 2001/133746; G02F 2001/133753; G02F 1/133711; G02F 1/133719; G02F 1/133788; G02F 1/133715

USPC .......... 428/1.2, 1.21, 1.23, 1.1; 349/123, 124, 349/129, 130, 131
See application file for complete search history.

(56) References Cited

U.S. PATENT DOCUMENTS

| | | | |
|---|---|---|---|
| 5,578,351 | A | 11/1996 | Shashidhar et al. |
| 6,013,335 | A | 1/2000 | Hirata et al. |
| 6,495,221 | B1 | 12/2002 | Ogawa et al. |
| 7,081,935 | B2 | 7/2006 | Chida et al. |
| 8,132,677 | B2 | 3/2012 | Liu et al. |
| 2004/0086662 | A1 | 5/2004 | Callegari et al. |
| 2005/0281959 | A1 | 12/2005 | Song |

(Continued)

FOREIGN PATENT DOCUMENTS

| | | |
|---|---|---|
| JP | 07-036047 | 2/1995 |
| JP | 09-120069 | 5/1997 |

(Continued)

OTHER PUBLICATIONS

Matienzo, L. J. et al., "Poly(dimethylsiloxane)-polyimide blends in the formation of thick poyimide films," J Mater Sci (2007), DOI 10.1007/s10853-006-1060-1, Jun. 7, 2005, Springer Science+Business Media, LLC 2006.

*Primary Examiner* — Gwendolyn Blackwell
*Assistant Examiner* — Ruiyun Zhang
(74) *Attorney, Agent, or Firm* — H.C. Park & Associates, PLC (57) ABSTRACT

A display device includes a first substrate, a first alignment layer disposed on the first substrate, a second substrate, a second alignment layer disposed on the second substrate, and a liquid crystal layer disposed between the first and second alignment layers and having liquid crystal molecules. At least one of the first and second alignment layers includes an initial alignment layer and a pretilting layer including a self-assembled monolayer disposed on the initial alignment layer.

8 Claims, 3 Drawing Sheets

(56) References Cited

U.S. PATENT DOCUMENTS

| | | |
|---|---|---|
| 2007/0059438 A1 | 3/2007 | Ong |
| 2007/0202253 A1 | 8/2007 | Ong |
| 2008/0226839 A1 | 9/2008 | Seki |
| 2009/0237604 A1 | 9/2009 | Nagae |
| 2012/0092602 A1 | 4/2012 | Akagawa et al. |
| 2012/0249940 A1* | 10/2012 | Choi et al. .................. 349/123 |

FOREIGN PATENT DOCUMENTS

| | | |
|---|---|---|
| JP | 2010-217866 | 9/2010 |
| KR | 10-2006-0028210 | 3/2006 |
| KR | 10-2009-0061376 | 6/2009 |
| KR | 10-2013-0005844 | 1/2013 |
| KR | 10-2013-0057153 | 5/2013 |

* cited by examiner

DISPLAY DEVICE AND METHOD OF MANUFACTURING THE SAME

CROSS-REFERENCE TO RELATED APPLICATION

This U.S. non-provisional patent application claims priority from and the benefit of Korean Patent Application No. 10-2012-0156746, filed on Dec. 28, 2012, which is hereby incorporated by reference for all purposes as if fully set forth herein.

BACKGROUND

1. Field

The present disclosure relates to a display device having an alignment layer used to align liquid crystal molecules and a method of manufacturing the display device.

2. Discussion of the Background

In general, a liquid crystal display is classified into a twisted nematic type liquid crystal display, a horizontal electric field type liquid crystal display, and a vertical electric field type liquid crystal display.

In the vertical electric field type liquid crystal display, liquid crystal molecules are aligned in a predetermined direction to allow a long axis of the liquid crystal molecules to be vertical to a substrate thereof when no electric field is applied. Accordingly, a viewing angle is wide and a contrast ratio is high.

The liquid crystal molecules are aligned in the predetermined direction by a rubbing method or an optical alignment method. As the optical alignment method, the liquid crystal molecules are aligned in the predetermined direction using a reactive mesogen. The reactive mesogen is included in an uncured liquid crystal layer, and then the reactive mesogen is cured when a light is radiated onto the liquid crystal layer, to thereby align the liquid crystal molecules. However, some of the reactive mesogen, which is not cured, remains after the curing process is performed, so that an afterimage defect occurs.

SUMMARY

The present disclosure provides a display device including an alignment layer capable of effectively pretilting liquid crystal molecules.

The present disclosure provides a method of manufacturing the display device.

Additional features of the invention will be set forth in the description which follows, and in part will be apparent from the description, or may be learned by practice of the invention.

Exemplary embodiments of the inventive concept provide a display device including a first substrate, a first alignment layer disposed on the first substrate, a second substrate, a second alignment layer disposed on the second substrate, and a liquid crystal layer disposed between the first alignment layer and the second alignment layer and having liquid crystal molecules. At least one of the first alignment layer and the second alignment layer includes an initial alignment layer and a self-assembled monolayer disposed on the initial alignment layer.

Exemplary embodiments of the inventive concept provide a method of manufacturing a display device including forming a first substrate, forming a second substrate, forming an initial alignment layer on at least one of the first substrate and the second substrate, forming a pretilting layer on the initial alignment layer, the pretilting layer including a self-assembled monolayer having a first functional group that is polymerizable, forming a liquid crystal layer between the first substrate and the second substrate, and polymerizing the first functional group to form a network in the self-assembled monolayer.

Exemplary embodiments of the inventive concept provide a method of manufacturing a display device including forming a first substrate, forming a second substrate, forming an initial alignment layer on at least one of the first substrate and the second substrate, forming a pretilting layer on the initial alignment layer, the pretilting layer including a self-assembled monolayer having a third functional group polarized by an electric field, and forming a liquid crystal layer between the first substrate and the second substrate.

According to the above, the display device may include the alignment layer having improved uniformity. In addition, the display device may effectively pretilt the liquid crystal molecules prevent afterimage from being generated or light leakage from occurring.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
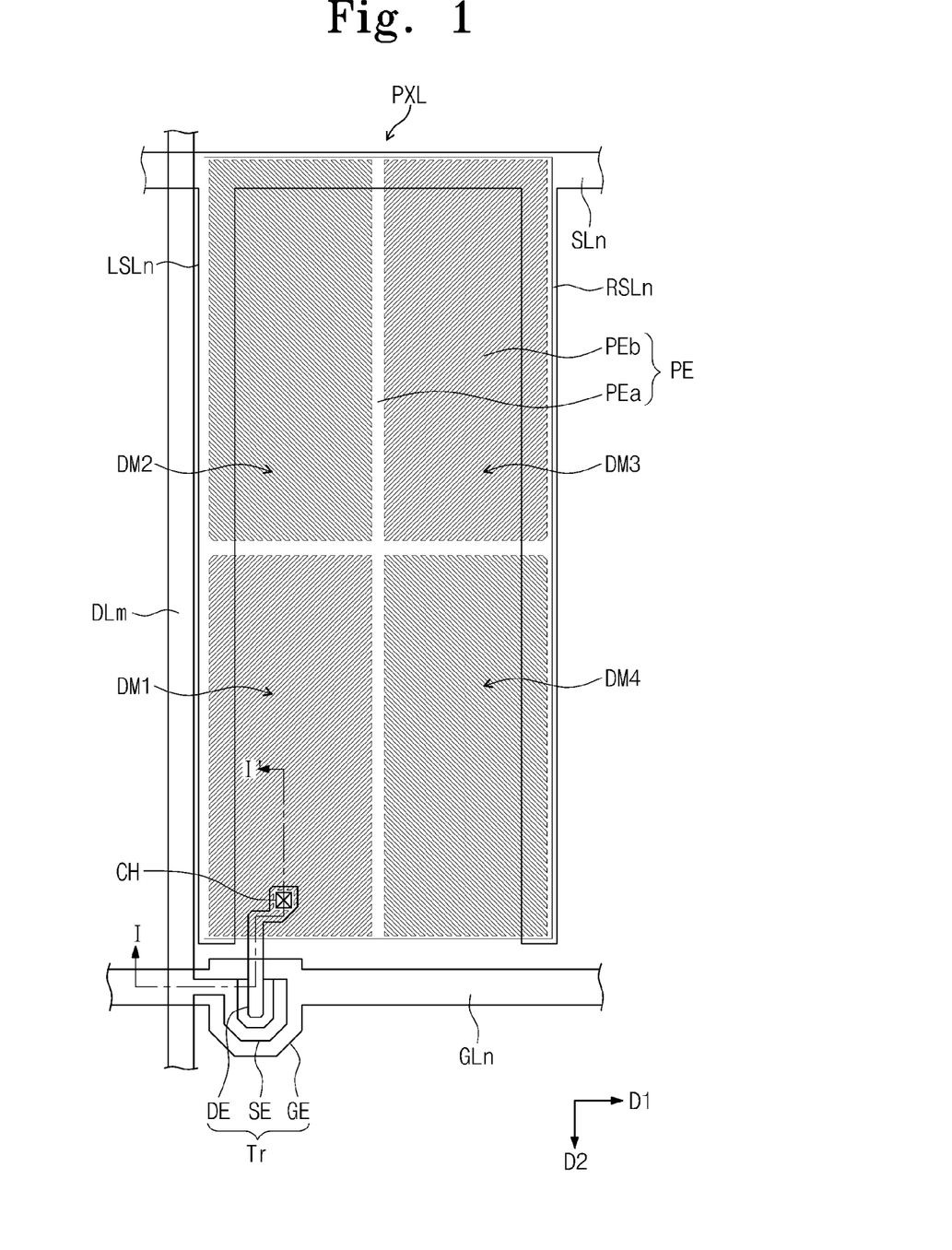
FIG. 1 is a plan view showing a liquid crystal display including a plurality of pixels according to an exemplary embodiment of the present disclosure.
Figure 2:
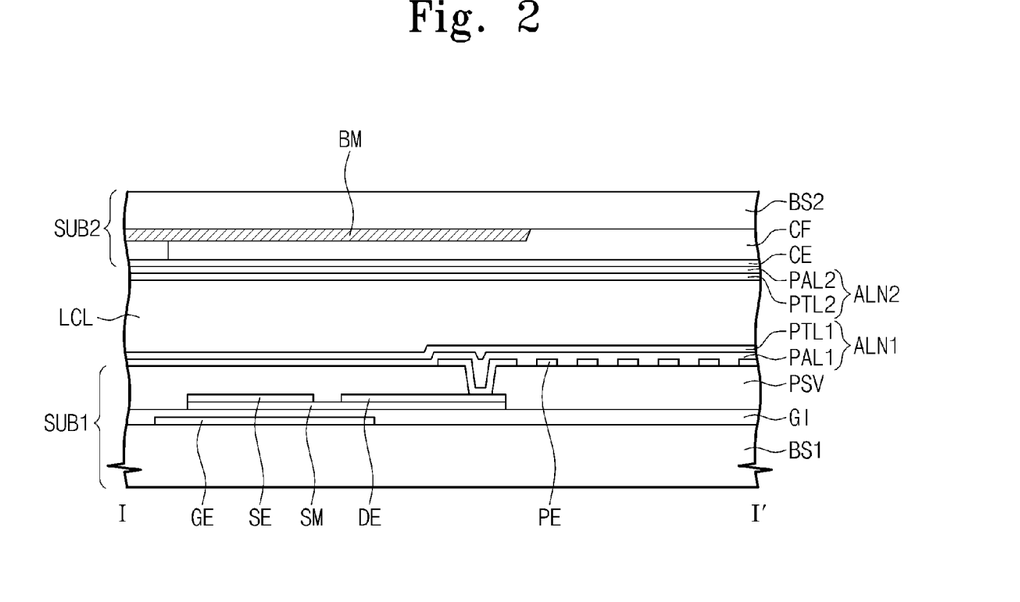
FIG. 2 is a cross-sectional view showing the liquid crystal display taken along a line I-I' shown in FIG. 1.

FIG. 1 is a plan view showing a liquid crystal display including a plurality of pixels PXL according to an exemplary embodiment of the present disclosure, and FIG. 2 is a cross-sectional view showing the liquid crystal display taken along a line I-I' shown in FIG. 1. In the present exemplary embodiment, the pixels PXL have the same structure and function, and thus, for the convenience of explanation, only one pixel has been shown in FIGS. 1 and 2 together with gate and data lines disposed adjacent to the pixel PXL.

Referring to FIGS. 1 and 2, the display device includes a first substrate SUB1, a first alignment layer ALN1 disposed on the first substrate SUB1, a second substrate SUB2 facing the first substrate SUB1, a second alignment layer ALN2 disposed on the second substrate SUB2, and a liquid crystal layer LCL disposed between the first alignment layer ALN1 and the second alignment layer ALN2.

The first substrate SUB1 includes a first base substrate BS1, a plurality of gate lines, a plurality of data lines, and the pixels PXL. For the convenience of explanation, FIGS. 1 and 2 show one pixel PXL with an n-th gate line GLn of the gate lines and an m-th gate line DLm of the data lines. However, the other pixels have the same structure as the pixel PXL, and hereinafter, the n-th gate line GLn and the m-th data line DLm will be referred to as a gate line and a data line, respectively.

The first base substrate SUB1 has a rectangular shape and is formed of a transparent insulating material. The gate line GLn is disposed on the first base substrate BS1 and extends in a first direction D1. The data line DLm is disposed on the gate line GLn with a gate insulating layer GI disposed therebetween and extends in a second direction D2 crossing the first direction D1. The gate insulating layer GI is disposed on the entire surface of the first base substrate BS1 to cover the gate line GLn.

The pixel PXL is connected to the gate line GLn and the data line DLm. The pixel PXL includes a thin film transistor Tr, a pixel electrode PE connected to the thin film transistor Tr, and a storage electrode part. The thin film transistor Tr includes a gate electrode GE, the gate insulating layer GI, a semiconductor pattern SM, a source electrode SE, and a drain electrode DE. The storage electrode part includes a storage line SLn and first and second branch electrodes LSLn and RSLn branched from the storage line SLn and extending in the second direction D2.

The gate electrode GE is protruded from the gate line GLn or is provided on a portion of the gate line GLn. The gate electrode GE may be formed of a metal material, e.g., nickel, chromium, molybdenum, aluminum, titanium, copper, tungsten, and alloys thereof. The gate electrode GE may have a single-layer structure or a multi-layer structure. For instance, the gate electrode GE may have a triple-layer structure of molybdenum-aluminum-molybdenum, a double-layer structure of titanium and copper, or a single-layer structure of an alloy of titanium and copper.

The semiconductor pattern SM is disposed on the gate insulating layer GI. The semiconductor pattern SM is disposed on the gate electrode GE with the gate insulating layer GI disposed therebetween. The semiconductor pattern SM is partially overlapped with the gate electrode GE. The semiconductor pattern SM includes an active pattern (not shown) disposed on the gate insulating layer GI and an ohmic contact layer (not shown) disposed on the active pattern. The active pattern includes an amorphous silicon thin layer, and the ohmic contact layer includes an n+ amorphous silicon layer. The ohmic contact layer allows the source and drain electrodes SE and DE to be in ohmic contact with the active pattern.

The source electrode SE is branched from the data line DLm. The source electrode SE is disposed on the ohmic contact layer and is partially overlapped with the gate electrode GE.

The drain electrode DE is spaced apart from the source electrode SE with the semiconductor pattern SM disposed therebetween, when viewed in a plan view. The drain electrode DE is disposed on the ohmic contact layer and is partially overlapped with the gate electrode GE.

The source electrode SE and the drain electrode DE may be formed of nickel, chromium, molybdenum, aluminum, titanium, copper, tungsten, or alloys thereof. The source electrode SE and the drain electrode DE may have a single-layer structure or a multi-layer structure including the above-mentioned metal materials. For instance, the source electrode SE and the drain electrode DE may have a double-layer structure of titanium and copper, which are sequentially stacked, or a single-layer structure of the alloy of titanium and copper.

Accordingly, an upper surface of the active pattern is exposed between the source electrode SE and the drain electrode DE, and the active pattern serves as a channel part, e.g., a conductive channel, between the source electrode SE and the drain electrode DE. The source electrode SE and the drain electrode DE are overlapped with the semiconductor pattern SM, except for the channel part between the source electrode SE and the drain electrode DE.

The pixel electrode PE is connected to the drain electrode DE with a protective layer PSV disposed therebetween. The pixel electrode PE is partially overlapped with the storage line SLn and first and second branch electrodes LSLn and RSLn, to form a storage capacitor.

The protective layer PSV covers the source electrode SE, the drain electrode DE, the channel part, and the gate insulating layer GI. The protective layer PSV includes a contact hole CH formed therethrough to expose a portion of the drain electrode DE. The protective layer PSV may include silicon nitride or silicon oxide.

The pixel electrode PE is connected to the drain electrode DE through the contact hole CH formed through the protective layer PSV. The pixel electrode PE includes a trunk portion PEa and a plurality of branch portions PEb that extend radially from the trunk portion. The trunk portion PEa or a part of the branch portions PEb is connected to the drain electrode DE through the contact hole CH.

The trunk portion PEa may have various shapes. As an example, the trunk portion PEa may be a cross-shaped, as shown in FIG. 1. In this case, the pixel PXL is divided into plural domains by the trunk portion Pea, and the branch portions PEb extend in different directions in each of the domains. In the present exemplary embodiment, as an example, the pixel PXL includes first, second, third, and fourth domains DM1, DM2, DM3, and DM4. The branch portions PEb are substantially in parallel to each other and are spaced apart from each other in each domain.

The branch portions PEb, which are adjacent to each other, are spaced apart from each other in terms of micrometers. This is to align liquid crystal molecules of the liquid crystal layer LCL to a specific azimuth on a plane parallel to the first base substrate BS1.

The pixel electrode PE is generally formed of a transparent conductive material. Particularly, the pixel electrode PE may be formed of a transparent conductive oxide, e.g., indium tin oxide (ITO), indium zinc oxide (IZO), indium tin zinc oxide (ITZO), etc.

The first alignment layer ALN1 is disposed on the pixel electrode PE to pretilt liquid crystal molecules of the liquid crystal layer LCL. The first alignment layer ALN1 includes a first initial alignment layer PAL1 disposed on the pixel electrode PE and a first pretilting layer PTL1 disposed on the first initial alignment layer PAL1.

The first initial alignment layer PAL1 includes a polymer, such as polyimide, polyamic acid, polysiloxane, etc., and serves as a main chain to which a self-assembled monolayer including the first pretilting layer PTL1 is attached. In addition, the first initial alignment layer PAL1 may be formed of an inorganic insulating layer as long as the first pretilting layer PTL1 is attached. For instance, the first initial alignment layer PAL1 may include silicon nitride or silicon oxide.

The first pretilting layer PTL1 includes the self-assembled monolayer attached to the first initial alignment layer PAL1 and is used to pretilt the liquid crystal molecules of the liquid crystal layer LCL. The self-assembled monolayer generally includes a siloxane compound having a first functional group that is polymerized to form a network structure. In addition, the self-assembled monolayer may include a siloxane compound having a second functional group that vertically aligns the liquid crystal molecules of the liquid crystal layer LCL.

The siloxane compound having the first functional group and the siloxane compound having the second functional group are represented by the following Chemical Formulas 1 and 2.

Chemical Formula 1

Chemical Formula 2

In Chemical Formulas 1 and 2, $Q_1$ denotes the first functional group and $Q_2$ denotes the second functional group. In addition, $Z_1$ and $Z_2$ independently denote —H, —CH$_3$, or —O**, * represents a connection with the initial alignment layer, and ** represents a single bond with an adjacent siloxane.

In addition, the self-assembled monolayer may further include a siloxane compound having a hydroxy group or an alcoxy group and having a carbon number of 1 through 5, in addition to the first and second functional groups.

The first functional group corresponds to a reactive mesogen group that causes a polymerization reaction to form the network structure when ultraviolet light is applied thereto. The term of "reactive mesogen" used herein means a photo-crosslinkable low molecular weight copolymer or a high molecular weight copolymer that causes a chemical reaction called polymerization. The reactive mesogen may include an acrylate group, a methacrylate group, an epoxy group, an oxetane group, a vinyl-ether group, a styrene group, a thiolene group, or the like. Accordingly, the first functional group is partially crosslinked by the polymerization reaction to pretilt the liquid crystal molecules at a predetermined tilt angle, with respect to a surface of the first or second substrate.

In the present exemplary embodiment, the first functional group may be at least one of an alkylated vinyl group having an aliphatic alkyl group with a carbon number of 1 to 18, or an alkylated cinnamoyl group having the aliphatic alkyl group with a carbon number of 1 to 18.

As an example, the first functional group may be at least one of

(n denotes 1 to 18, $X_1$ denotes an alkyl group, an ether group (—O—), or an ester group (—COO—), $Y_1$ denotes a methyl group or hydrogen), or

(n denotes 1 to 18, $X_2$ denotes a methyl group, an ether group, an ester group, a phenyl group, a cyclohexyl group, or a phenylester group, $Y_2$ denotes an alkyl group with a carbon number of 1 to 18, a phenyl group, a biphenyl group, a cyclohexyl group, a bicyclohexyl group, or a phenylcyclohexyl group).

The second functional group may be at least one of an alkoxy group having an aliphatic alkyl group with a carbon number of 1 to 25, a cholesteric group, an alicyclic group having an aliphatic alkyl group with a carbon number of 1 to 10, or an aromatic group having an aliphatic alkyl group with a carbon number of 1 to 10. The aliphatic alkyl group may include (n denotes 1 to 25). The alicyclic group may include (m denotes 1 to 5, n denotes 1 to 10). The aromatic group may include (m denotes 1 to 5, n denotes 1 to 10).

The first initial alignment layer PAL1 and the first pretilting layer PTL1 include plural areas corresponding to the first to fourth domains DM1 to DM4 of the pixel electrode PE. In the present exemplary embodiment, the first initial alignment layer PAL1 and the first pretilting layer PTL1 include first to fourth areas, and the liquid crystal molecules are aligned in different directions in the first to fourth domains DM1 to DM4.

The second substrate SUB2 includes a second base substrate BS2, a color filter CF, and a black matrix BM. The color filter CF is disposed on the second base substrate BS2 to assign a color to the light passing through the liquid crystal layer LCL. In the present exemplary embodiment, the color filter CF is disposed on the second substrate SUB2, but is not limited the second substrate SUB2. That is, the color filter CF may be disposed on the first substrate SUB1 rather than the second substrate SUB2.

The black matrix BM is disposed to correspond to a light blocking area of the first substrate SUB1. The light blocking area encompasses the data line DLm, the thin film transistor Tr, and the gate line GLn. Since the pixel electrode PE is not formed in the light blocking area, the liquid crystal molecules are not aligned, and thus, light leakage occurs. Thus, the black matrix BM is disposed in the light blocking area to block the light leakage.

The common electrode CE is disposed on the color filter CF and forms an electric field in cooperation with the pixel electrode PE, to drive the liquid crystal layer LCL. The common electrode CE is formed of a transparent conductive material. In detail, the common electrode CE may be formed of a conductive metal oxide, such as indium tin oxide, indium zinc oxide, or indium tin zinc oxide.

The second alignment layer ALN2 is disposed on the common electrode CE to pretilt the liquid crystal molecules of the liquid crystal layer LCL. The second alignment layer ALN2 includes a second initial alignment layer disposed on the common electrode CE and a second pretilting layer PTL2 disposed on the second initial alignment layer PAL2.

The second initial alignment layer PAL2 generally includes a polymer, such as polyimide, polyamic acid, polysiloxane, etc., and serves as a main chain to which a self-assembled monolayer consisting of the second pretilting layer PTL2 is attached. The second pretilting layer PTL2 includes the self-assembled monolayer attached to the second initial alignment layer PAL2 and is used to pretilt the liquid crystal molecules of the liquid crystal layer LCL.

The self-assembled monolayer generally includes a siloxane compound having a first functional group that is polymerized to form a network structure. In addition, the self-assembled monolayer may include a siloxane compound having a second functional group that vertically aligns the liquid crystal molecules of the liquid crystal layer LCL.

In the present exemplary embodiment, each of the first and second alignment layers ALN1 and ALN2 includes the initial alignment layer and the pretilting layer, but the present disclosure is not limited thereto. That is, one or both of the first and second alignment layers ALN1 and ALN2 may be in the form of a single layer.

The second pretilting layer PTL2 includes the same material as the first pretilting layer PTL1 or a different material from the first pretilting layer PTL1 among the materials respectively represented by Chemical Formulas 1 and 2.

The liquid crystal layer LCL having the liquid crystal molecules is disposed between the first substrate SUB1 and the second substrate SUB2. The liquid crystal layer LCL has a negative dielectric anisotropy, but is not limited thereto. That is, the liquid crystal layer LCL may have a positive dielectric anisotropy.

In the display device, when a gate signal is applied to the gate line GLn, the thin film transistor TR is turned on. Therefore, the data signal applied to the data line DLm is applied to the pixel electrode PE through the turned-on thin film transistor Tr. When the data signal is applied to the pixel electrode PE through the turned-on thin film transistor Tr, the electric field is generated between the pixel electrode PE and the common electrode CE. Due to the electric field generated by a difference of voltages respectively applied to the common electrode CE and the pixel electrode PE, the liquid crystal molecules are driven. Accordingly, an amount of the light passing through the liquid crystal layer LCL is varied, and thus, the image is displayed in the display device.

Meanwhile, the display device according to the present exemplary embodiment may have various pixel structures. For instance, one pixel may be connected to two gate lines and one data line according to other embodiments. In addition, one pixel may be connected to one gate line and two data lines according to some embodiments. Further, one pixel may include two sub-pixels applied with different voltages from each other. In this case, one of the sub-pixels is applied with a high voltage and the other one of the sub-pixels is applied with a low voltage. In addition, in the present exemplary embodiment, the pixel electrode has fine slits and the common electrode does not include any slits, but the present disclosure is not so limited. As an example, a domain division member, e.g., a slit or protrusion, may be provided in the pixel electrode and the common electrode, to divide each pixel into plural domains.

Figure 3:
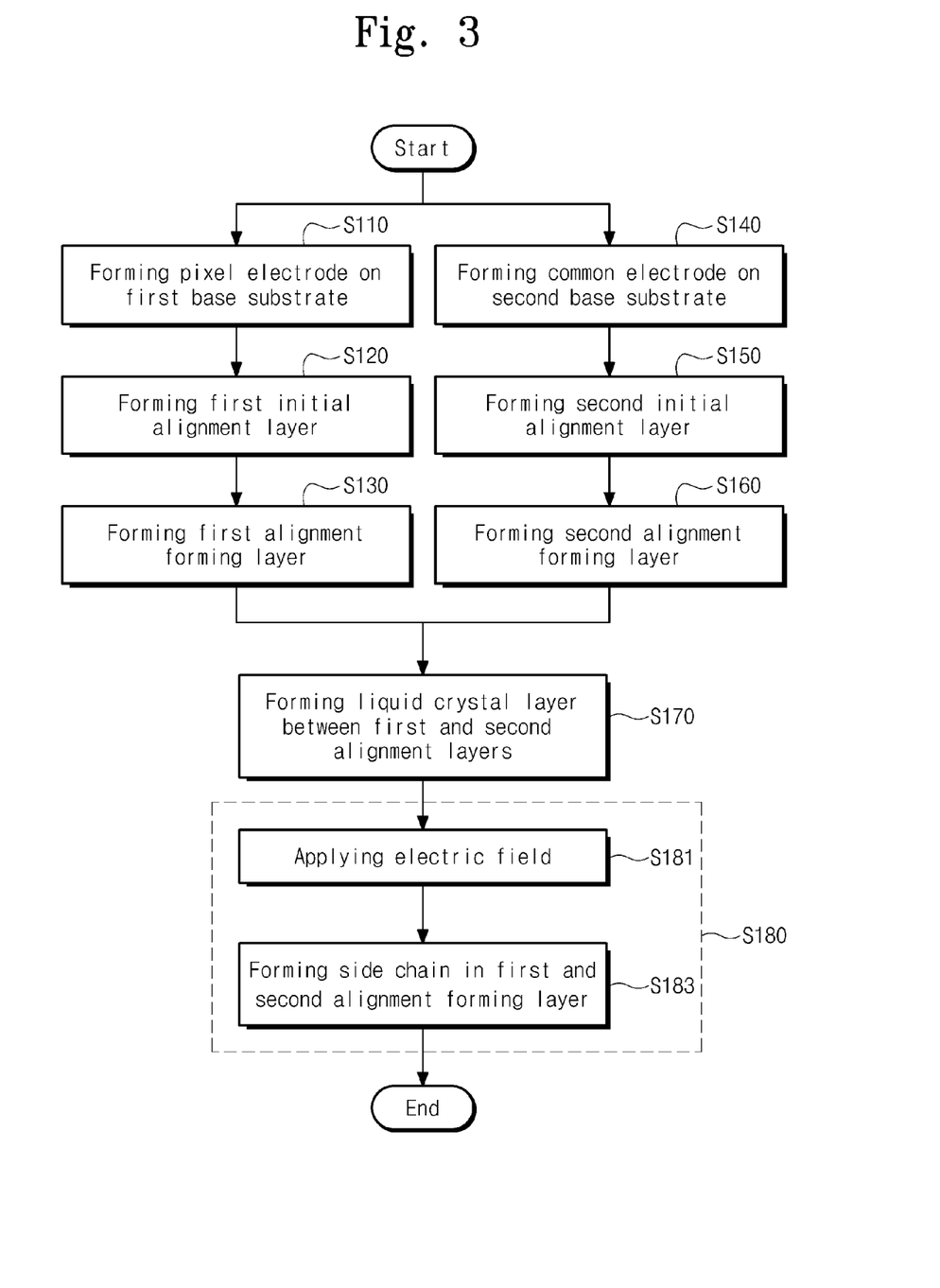
FIG. 3 is a flowchart showing a method of manufacturing a display device according to an exemplary embodiment of the present disclosure.

FIG. 3 is a flowchart showing a method of manufacturing a display device, according to an exemplary embodiment of the present disclosure. Referring to FIG. 3, in order to manufacture the display device, various elements including the pixel electrode are formed on the first base substrate (S110), the first initial alignment layer is formed on the first base substrate (S120), and the first pretilting layer is formed on the first initial alignment layer (S130). Separately, various elements including the common electrode are formed on the second base substrate (S140), the second initial alignment layer is formed on the second base substrate (S150), and the second alignment layer is formed on the second initial alignment layer as the self-assembled monolayer (S160). Then, the liquid crystal layer is disposed between the first initial alignment layer and the second initial alignment layer (S170). After that, the first alignment layer and the second alignment layer are polymerized to form the network structure (S183), while the electric field is applied to the liquid crystal layer (S181). Thus, the first and second alignment layers are formed (S180).

Hereinafter, the method of manufacturing the display device will be described in detail with reference to FIGS. 1 to 3. First, the method of forming the elements including the pixel electrode on the first base substrate BS1 will be described in detail with reference to FIGS. 1 and 2.

A gate pattern is formed on the first base substrate BS1. The gate pattern includes the gate line GLn and the storage electrode part. The gate pattern is formed by a photolithography process. The gate insulating layer GI is formed on the gate pattern.

The semiconductor layer SM is formed on the gate insulating layer GI. The semiconductor layer SM includes the active pattern and the ohmic contact layer formed on the active pattern. The semiconductor layer SM is formed using a photolithography process.

A data pattern is formed on the semiconductor layer SM. The data pattern includes the data line DLm, the source electrode SE, and the drain electrode DE. The data pattern is formed using a photolithography process. In this case, the semiconductor layer SM and the data pattern may be formed using one half mask or one diffraction mask.

The protective layer PSV is formed on the data pattern. The protective layer PSV is provided with the contact hole CH formed therethrough, to expose the portion of the drain electrode DE. The protective layer PSV is formed by a photolithography process.

The pixel electrode PE is formed on the protective layer PSV to be connected to the drain electrode DE through the contact hole CH. The pixel electrode PE is formed using a photolithography process.

Then, the first initial alignment layer PAL1 is formed on the first base substrate BS1 on which the pixel electrode PE is formed. The first initial alignment layer PAL1 is formed by coating an alignment solution containing a polymer, e.g., polyimide, polyamic acid, etc., or a monomer of the polymer on the first base substrate BS1 and heating the alignment solution. In addition, the first initial alignment layer PAL1 is formed by depositing polysiloxane.

Then, the first pretilting layer PTL1 is formed on the first initial alignment layer PAL1. The first pretilting layer PTL1 is formed on the first initial alignment layer PAL1 by surface-treating the first initial alignment layer PAL1 using ultraviolet rays and ozone, or oxygen, and the self-assembling a silane compound with the first functional group, which is represented by the following Chemical Formula 3. When the surface of the first initial alignment layer PAL1 is treated by the ultraviolet rays or ozone, a portion of the polymer at the surface of the first initial alignment layer PAL1 is substituted with —OH, —OOH, —OO—, or the like.

Then, the first initial alignment layer PAL1 is silanized using the following Chemical Formula 3.

Chemical Formula 3

In Chemical Formula 3, $Q_1$ denotes the first functional group, and $Z_1$, $Z_2$, and $Z_3$ independently denote —H, —CH$_3$, —Cl, —OCH$_3$, —OCH$_2$CH$_3$, —OCOCH$_3$, or —OCH$_2$CH$_2$CH$_3$, except the cases i), ii) and iii) as below.

i) all the $Z_1$, $Z_2$, and $Z_3$ are —H,
ii) all the $Z_1$, $Z_2$, and $Z_3$ are —CH$_3$, or
iii) one or two of the $Z_1$, $Z_2$, and $Z_3$ are —H and the remaining are —CH$_3$.

The first functional group may be at least one of (n denotes 1 to 18, $X_1$ denotes an alkyl group, an ether group (—O—), or an ester group (—COO—), $Y_1$ denotes a methyl group or hydrogen) or (n denotes 1 to 18, $X_2$ denotes a methyl group, an ether group, an ester group, a phenyl group, a cyclohexyl group, or a phenylester group, $Y_2$ denotes an alkyl group with a carbon number of 1 to 18, a phenyl group, a biphenyl group, a cyclohexyl group, a bicyclohexyl group, or a phenylcyclohexyl group).

The silanization of the first initial alignment layer PAL1 is performed in a liquid state or a gaseous state. The liquid silanization process of the first initial alignment layer PAL1 is performed by preparing a silane compound solution represented by the Chemical Formula 3 and dipping the first substrate SUB1, on which the first initial alignment layer PAL1 is formed, into the silane compound solution. The silane compound solution may include water as a catalyst. The silane compound provided in a solvent used to dissolve the silane compound has a concentration of about 100 mol, and the first substrate SUB1 is dipped in the silane compound solution for a time period equal to or shorter than about 24 hours. The first substrate SUB1 is cleaned by a cleaning solution, e.g., deionized water, after being brought out from the silane compound solution.

The gaseous silanization process is performed by loading the first substrate SUB1 on which the first initial alignment layer PAL1 is formed into a vacuum chamber maintained in a pressure of about 500 Pa together with the silane compound represented by the Chemical Formula 3. In this case, a vapor is injected into the vacuum chamber as a catalyst to allow the silane compound to be self-assembled to the first initial alignment layer PAL1 after air in the vacuum chamber is discharged to the outside of the vacuum chamber.

The liquid or gaseous silanization processes, which use the water as the catalyst, are expressed as the following Chemical Formula 4. For the convenience of explanation, each of $Z_1$, $Z_2$, and $Z_3$ is —Cl in the following Chemical Formula 4. Portions represented by a box represent the first initial alignment layer PAL1.

Chemical Formula 4

The liquid or gaseous silanization processes, which do not use the water as the catalyst, are expressed as the following Chemical Formula 5. For the convenience of explanation, each of $Z_1$ and $Z_2$ denotes —$CH_3$ and $Z_3$ denotes —$OCH_3$, in the following Chemical Formula 5 Portions represented by a box represent the first initial alignment layer PAL1.

Chemical Formula 5

Here, in a case that there is the group of the first functional group, which causes a reaction in the silanization process, a protecting group is used to reduce reactivity. As such, the network structure may thereby be prevented from being prematurely formed during the silanization process.

In the present exemplary embodiment, the self-assembled monolayer may include the silane compound with the second functional group, which is represented by the following Chemical Formula 6. The silane compound represented by the following Chemical Formula 6 may be self-assembled on the first initial alignment layer PAL1 in the same way as the silane compound represented by the Chemical Formula 3, and self-assembled together with the silane compound represented by the Chemical Formula 3 in the same process.

Chemical Formula 6

In Chemical Formula 6, $Q_2$ denotes the second functional group, and $Z_1$, $Z_2$, and $Z_3$ independently denote —H, —$CH_3$, —Cl, —$OCH_3$, —$OCH_2CH_3$, —$OCOCH_3$, or —$OCH_2CH_2CH_3$, except the cases i), ii) and iii) as below.

i) all the $Z_1$, $Z_2$, and $Z_3$ are —H, ii) all the $Z_1$, $Z_2$, and $Z_3$ are —$CH_3$, or iii) one or two of the $Z_1$, $Z_2$, and $Z_3$ are —H and the remaining are —$CH_3$.

The second functional group may be at least one of an alkoxy group having an aliphatic alkyl group with a carbon number of 1 to 25, a cholesteric group, an alicyclic group having an aliphatic alkyl group with a carbon number of 1 to 10, or an aromatic group having an aliphatic alkyl group with a carbon number of 1 to 10. The aliphatic alkyl group may include (n denotes 1 to 25). The alicyclic group may include (m denotes 1 to 5, n denotes 1 to 10). The aromatic group may include (m denotes 1 to 5, n denotes 1 to 10).

In addition, the silane compound having the hydroxy group or the alkoxy group with the carbon number of 1 to 25 may be self-assembled on the first initial alignment layer PAL1 in the same way as the silane compound represented by the Chemical Formula 3, and may be self-assembled together with the silane compound represented by the Chemical Formula 3 in the same process.

Separate from the process of forming the first initial alignment layer PAL1 and the first pretilting layer PTL1 on the first substrate SUB1, the color filter CF is formed on the second base substrate BS2. The common electrode CE is formed on the color filter CF. The color filter CF and the common electrode CE may be formed by a photolithography process, but the present disclosure is not limited thereto. When the second initial alignment layer PAL2 is formed on the second substrate SUB2, the second pretilting layer PTL2 is formed on the second initial alignment layer PAL2 as the self-assembled monolayer. In the present exemplary embodiment, the second initial alignment layer PAL2 and the second pretilting layer PTL2 may be formed in the same way as the first initial alignment layer PAL1 and the first pretilting layer PTL1. Thus, detailed descriptions of the second initial alignment layer PAL2 and the second pretilting layer PTL2 will be omitted.

Then, the liquid crystal layer LCL is formed between the first pretilting layer PTL1 and the second pretilting layer PTL2. The light, e.g., the ultraviolet rays, is radiated onto the first and second pretilting layers PTL1 and PTL22, while the electric field is applied to the liquid crystal layer LCL. The first functional groups of the first and second initial alignment layers PAL1 and PAL2 are polymerized due to the irradiation, so as to form a side chain. Thus, the first and second alignment layers ALN1 and ALN2 are formed.

The electric field is formed by apply the voltages to the pixel electrode PE and the common electrode CE, respectively. In more detail, when the electric field is applied to the liquid crystal molecules, the first functional groups are aligned in the same direction as the liquid crystal molecules disposed adjacent to the first functional groups. Due to the radiation of the light, the first functional groups are polymerized with each other, thereby forming the network between the first functional groups. That is, the first functional groups are coupled to adjacent first functional groups to form the side chains. In this case, since the first functional groups form the network while the liquid crystal molecules are aligned, the first functional groups have a specific directional property, in accordance with an average alignment direction of the liquid crystal molecules. Accordingly, when the electric field is removed, the liquid crystal molecules disposed adjacent to the network have a pretilt angle.

The display device according to the present exemplary embodiment does not require a phase separation process when the first and second alignment layers ALN1 and ALN2 are formed. Generally, when a phase separation process is not performed, different phases may be irregularly arranged, and the density of the functional groups may be irregular on the surface of the first and second alignment layers, according to the type of the functional groups. However, even when the phase separation process is omitted in the present exemplary embodiment, defects related to the functional groups of the first and second alignment layers may still be prevented.

According to another exemplary embodiment, the first pretilting layer and the second pretilting layer may be formed using a compound other than the silane compound. Hereinafter, differences between this and previous exemplary embodiments will be mainly described, in order to avoid redundancy.

In an exemplary embodiment, at least one of first and second pretilting layers PTL1 and PTL2 is configured to include the self-assembled monolayer coupled to the initial alignment layer, i.e., the first initial alignment layer PAL1 or the second initial alignment layer PAL2.

The self-assembled monolayer may include a siloxane compound having a third functional group, which is polarized in accordance with the application of the electric field, to cause an interaction with the liquid crystal molecules.

The siloxane compound having the third functional group is represented by the following Chemical Formula 7.

Chemical Formula 7

In Chemical Formula 7, $Q_3$ denotes the third functional group. In addition, $Z_1$ and $Z_2$ independently denote —H, —$CH_3$, or —O**, * represents a connection with the initial alignment layer, and ** represents a single bond with an adjacent siloxane.

The third functional group may be at least one of the materials represented by the following Chemical Formulas 8a-8r.

Chemical Formula 8a-8r

8a

8b

8c

-continued

8d

8e

8f

8g

8h

8i

8j

8k

8l

8m

8n

8o

8p

8q

8r

In Chemical Formulas 8a-8r, $R_1$ denotes —F, —CN, —OCH$_3$, or —NO$_2$, $R_2$ denotes —F, —CN, —OCH$_3$, or —NO$_2$, and $R_3$ denotes —F, —CN, —OCH$_3$, or —NO$_2$.

In another exemplary embodiment, the self-assembled monolayer may include the siloxane compound having the second functional group that vertically aligns the liquid crystal molecules, in addition to the third functional group.

The display device according to an exemplary embodiment is manufactured by forming first and second substrates, forming the initial alignment layer on at least one of the first and second substrates, forming the pretilting layer including the self-assembled monolayer having the polarized third functional group, and forming the liquid crystal layer between the first and second substrates.

The pretilting layer is formed by surface-treating the initial alignment layer using ultraviolet rays or ozone, and self-assembling a siloxane compound having the third functional group, which is represented by the following Chemical Formula 9.

Chemical Formula 9

In Chemical Formula 9, $Q_3$ denotes the third functional group and $Z_1$, $Z_2$ and $Z_3$ independently denote —H, —$CH_3$, —Cl, —$OCH_3$, —$OCH_2CH_3$, —$OCOCH_3$, or —$OCH_2CH_2CH_3$, except the cases i), ii) and iii) as below.

i) all the $Z_1$, $Z_2$, and $Z_3$ are —H,
ii) all the $Z_1$, $Z_2$, and $Z_3$ are —$CH_3$, or
iii) one or two of the $Z_1$, $Z_2$, and $Z_3$ are —H and the remaining are —$CH_3$.

The siloxane compound represented by the Chemical Formula 9 is self-assembled to the initial alignment layer using the self-assembling method described above.

In the display device, the liquid crystal molecules are aligned in a specific direction by an interaction between the first and second alignment layers, in accordance with the application of the electric field. In detail, the liquid crystal molecules are easily aligned in the specific direction by the electrical interaction between the third functional group and the liquid crystal molecules.

In more detail, the liquid crystal molecules are substantially vertically aligned with respect to the surface of the alignment layer, by the second functional group, when the electric field is not applied to the liquid crystal molecules. When the electric field is applied to the liquid crystal molecules, the liquid crystal molecules tend to be aligned in a predetermined direction, and the liquid crystal molecules are easily aligned in the predetermined direction by a dipole-dipole interaction between the third functional group and the liquid crystal molecules. Then, when the electric field is not applied to the liquid crystal molecules again, the liquid crystal molecules are vertically aligned by the second functional group. Therefore, a response speed of the liquid crystal molecules is improved, and the liquid crystal molecules may be driven with a smaller driving voltage.

In addition, the display device according to another exemplary embodiment does not require the phase separation process, thereby preventing defects related to the alignment layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
a first substrate;
a first alignment layer disposed on the first substrate;
a second substrate;
a second alignment layer disposed on the second substrate; and
a liquid crystal layer disposed between the first alignment layer and the second alignment layer and comprising liquid crystal molecules; and
electrodes disposed on at least one of the first substrate and the second substrate and configured to apply an electric field to the liquid crystal layer,
wherein at least one of the first alignment layer and the second alignment layer comprises an initial alignment layer and a pretilting layer comprising a self-assembled monolayer disposed on the initial alignment layer,
wherein the self-assembled monolayer further comprises a siloxane compound comprising a second functional group represented by the following Chemical Formula 2, and which is polarized in accordance with field lines of the electric field,

Chemical Formula 2 wherein,
$Q_2$ is the second functional group,
$Z_1$ and $Z_2$ are independently —H, —$CH_3$, or —O**, and
* is a connection with the initial alignment layer,
wherein ** is a single bond with an adjacent siloxane compound
wherein the second functional group comprises represented by at least one of the following Chemical Formulas 3a-3r,
Chemical Formulas 3a-3r, Chemical Formula 3a-3r

3a

3b

-continued

3c

3d

3e

3f

3g

3h

3i

3j

3k

3l

3n

3o

3m

3p

3q

-continued

3r wherein,
R$_1$ is —F, —CN, —OCH$_3$ or —NO$_2$,
R$_2$ is —F, —CN, —OCH$_3$ or —NO$_2$ and
R$_3$ is —F, —CN, —OCH$_3$ or —NO$_2$.

2. The display device of claim 1, wherein the self-assembled monolayer comprises a siloxane compound comprising a first functional group that is polymerized into a network, the siloxane compound being represented by the following Chemical Formula 1,

Chemical Formula 1 wherein,
Q$_1$ is the first functional group,
Z$_1$ and Z$_2$ independently are —H, —CH$_3$, or —O**, and
* is a connection with the initial alignment layer,
wherein ** is a single bond with an adjacent siloxane compound.

3. The display device of claim 2, wherein the first functional group comprises at least one of an alkylated vinyl group comprising an aliphatic alkyl group with a carbon number of 1 to 18, or an alkylated cinnamoyl group comprising the aliphatic alkyl group with a carbon number of 1 to 18.

4. The display device of claim 3, wherein the first functional group comprises at least one of:

wherein,
n is an integer from 1 to 18,
X$_1$ is an alkyl group, an ether group (—O—), or an ester group (—COO—), and
Y$_1$ is a methyl group or hydrogen; and wherein,
n is a number from 1 to 18,
X$_2$ is a methyl group, an ether group, an ester group, a phenyl group, a cyclohexyl group, or a phenylester group, and
Y$_2$ is an alkyl group with a carbon number of 1 to 18, a phenyl group, a biphenyl group, a cyclohexyl group, a bicyclohexyl group, or a phenylcyclohexyl group.

5. The display device of claim 2, wherein the self-assembled monolayer further comprises a siloxane compound comprising a third functional group to vertically align the liquid crystal molecules of the liquid crystal layer, the third functional group being represented by the following Chemical Formula 4, Chemical Formula 4

Chemical Formula 4 wherein,
Q$_3$ is the third functional group,
Z$_1$ and Z$_2$ are independently —H, —CH$_3$, or —O**, and
* is a connection with the initial alignment layer,
wherein ** is a single bond with an adjacent siloxane compound.

6. The display device of claim 5, wherein the third functional group comprises at least one of:
an alkoxy group comprising an aliphatic alkyl group with a carbon number of 1 to 25;
a cholesteric group;
an alicyclic group comprising an aliphatic alkyl group with a carbon number of 1 to 10; and
an aromatic group comprising an aliphatic alkyl group with a carbon number of 1 to 10.

7. The display device of claim 1, wherein the initial alignment layer comprises a polyimide, a polyamic acid, or a polysiloxane.

8. The display device of claim 1, wherein the self-assembled monolayer further comprises a siloxane compound comprising a third functional group to vertically align the liquid crystal molecules of the liquid crystal layer, the third functional group being represented by the following Chemical Formula 4, Chemical Formula 4

Chemical Formula 4 wherein,
Q$_3$ is the third functional group,
Z$_1$ and Z$_2$ are independently —H, —CH$_3$, or —O**, and
* is a connection with the initial alignment layer,
wherein ** is a single bond with an adjacent siloxane compound.

* * * * *